United States Patent
Nakano

[11] Patent Number: 6,097,893
[45] Date of Patent: Aug. 1, 2000

[54] OPTICAL DEVICE

[75] Inventor: Shingo Nakano, Akishima, Japan

[73] Assignee: Canon Kabushiki Kaisha, Tokyo, Japan

[21] Appl. No.: 09/275,304

[22] Filed: Mar. 24, 1999

[30] Foreign Application Priority Data

Mar. 31, 1998 [JP] Japan ................................ 10-101734

[51] Int. Cl.[7] .......................... G03B 13/36; G03B 17/00
[52] U.S. Cl. .......................... 396/51; 396/104; 396/121
[58] Field of Search ............................ 396/51, 104, 121

[56] References Cited

U.S. PATENT DOCUMENTS

| | | | |
|---|---|---|---|
| 4,459,006 | 7/1984 | Sakai et al. | 396/104 |
| 5,614,985 | 3/1997 | Odaka | 396/51 |
| 5,907,723 | 5/1999 | Inoue | 396/51 |

*Primary Examiner*—W. B. Perkey
*Attorney, Agent, or Firm*—Robin, Blecker & Daley

[57] ABSTRACT

In an optical device having a line of sight detection circuit for detecting the line of sight of a user, a focus area selection circuit for selecting at least one of a plurality of focus areas on the basis of the detection result of the line of sight detection circuit, a focus detection circuit for detecting the focus state of the focus area selected by the focus area selection circuit, and a lens moving circuit for moving a lens, a control circuit controls the focus detection circuit and the lens moving circuit to repeat operation for checking if focus detection has become possible without moving the lens for a predetermined period of time when the detection result of the focus detection circuit indicates that focus detection is impossible, and to repeat the operation for checking if focus detection has become possible while moving the lens when the detection result of the focus detection circuit indicates that focus detection is impossible even after an elapse of the predetermined period of time.

14 Claims, 6 Drawing Sheets

OPTICAL DEVICE

BACKGROUND OF THE INVENTION

1. Field of the Invention

The present invention relates to an optical device which detects the focus state of an object to perform automatic focus adjustment operation.

2. Related Background Art

As one type of conventional focus detection means for a camera, a means which determines an in-focus state by observing a correlative position displacement between two images formed by light beams that have passed through pupil areas obtained by splitting the exit pupil of a photo-taking lens is known. For example, a secondary imaging system which guides optical images formed on a prospective focal plane (a plane corresponding to a film surface) to two sensor surfaces by two juxtaposed secondary imaging optical systems, and detects the correlative position displacement between these two images is disclosed in Japanese Patent Application Laid-Open Nos. 55-118019, 55-155331, and the like.

In such focus detection means, if it is determined that the two obtained images have poor reliability (low contrast), focus detection incapable operation is done. As the focus detection incapable operation, so-called "search operation" for performing focus detection by moving the photo-taking lens by a predetermined amount or while continuously moving the photo-taking lens, to expect an increase in contrast, is disclosed in Japanese Patent Publication No. 6-5335, or the like.

On the other hand, a so-called "multi-point AF camera" which has a plurality of focus detection means to detect the focus states of a plurality of areas in the frame, and adjusts the focus of the photo-taking lens on the basis of the detection results is known. The plurality of areas that allow focus detection in the frame are also called "focus detection points" Furthermore, a camera having a so-called line of sight detection device for detecting a position in the viewfinder frame where the photographer is gazing has also been proposed.

For example, Japanese Patent Application Laid-Open No. 1-241511 discloses a camera which senses an image of a front eye portion of an eyeball of the photographer illuminated with light emitted by an infrared emitting diode (to be abbreviated as IRED hereinafter) using an area sensor, detects the line of sight coordinate position of the photographer on the viewfinder by processing the obtained image signal, and selects one of a plurality of focus detection points or photometry areas of the multi-point AF camera on the basis of the detection result.

An auto focus mode of a conventional camera includes two modes, i.e., a one-shot AF mode in which focus detection is continued until the photo-taking lens reaches an in-focus state, and is stopped once the in-focus state is reached, and a servo AF mode in which focus detection is continued irrespective of the focus state of the photo-taking lens.

The operation in the one-shot AF mode of the camera with the aforementioned line of sight detection means is as follows.

When a switch SW1 is turned on at the first stroke position of a release button, the line of sight detection means detects the gazing point of the photographer in the viewfinder, and determines a focus detection point corresponding to the detected gazing point. Then, the focus detection means detects the focus state at the focus detection point determined by the line of slight detection means, and the photo-taking lens is driven to an in-focus position on the basis of that information. Once the line of sight detection means determines the focus detection point, focusing is done in consideration of only the focus state of that focus detection point until an in-focus state is reached.

In the one-shot AF mode, since the release switch cannot be pressed unless an in-focus state is reached, no line of sight detection is done during release operation (including continuous shot operation, of course).

The operation in the servo AF mode of the camera with the line of sight detection means is as follows.

As in the one-shot AF mode, immediately after the switch SW1 is turned on, the line of sight detection means operates to determine the focus detection point. After that, the photo-taking lens is driven to an in-focus point on the basis of focus detection calculation information at that focus detection point. In this mode, while the switch SW1 is ON, detection and calculation of the focus state, and lens driving repeat themselves.

In the servo AF mode as well, no line of sight detection is done during release operation (including continuous shot operation, of course) as in the one-shot AF mode.

In such camera, the following problems are posed upon selecting the servo AF mode. The problems will be explained below with reference to FIGS. 6A and 6B.

Figure 6A:
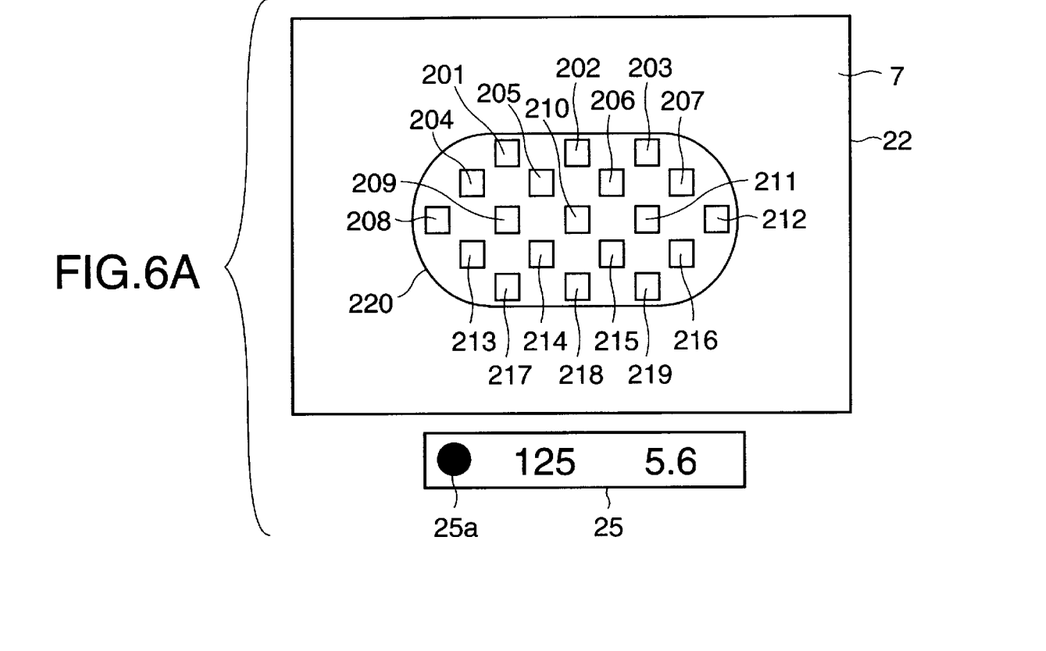
FIGS. 6A and 6B show the indications in a viewfinder of the single-lens reflex camera shown in FIG. 1 and a conventional camera.

FIGS. 6A and 6B show in-finder views. Referring to FIG. 6A, the focus states of the photo-taking lens are detected at focus detection points 201 to 219. Such multi-point AF can be implemented by using Japanese Patent Application Laid-Open No. 9-184968. Note that these focus detection points 201 to 219 are indicated in a transmission LCD panel as a known technique, and FIG. 6A illustrates a state wherein all the focus detection points are indicated. However, when all the focus detection points are indicated all the time during photo-taking, they disturb the field of view of the photographer, and an object is hard to confirm. For this reason, normally, all the focus detection points are OFF and only a focus detection frame 220 printed on a focusing screen is indicated. When the line of sight detection means selects one focus detection point, the selected focus detection point alone is turned on.

In the aforementioned arrangement, a sequence upon servo AF photo-taking will be explained.

The photographer brings a principal object to be taken into the focus detection frame 220, and turns on the switch SW1 while gazing at this principal object. Immediately after the switch SW1 is ON, photometry operation and line of sight detection are executed in turn, thus selecting a focus detection point. When a focus detection point is selected, the selected focus detection point is indicated within the viewfinder. After that, the focus state of that focus detection point is detected, the driving amount of the photo-taking lens is calculated, and the photo-taking lens is driven to a predetermined position.

Figure 6B:
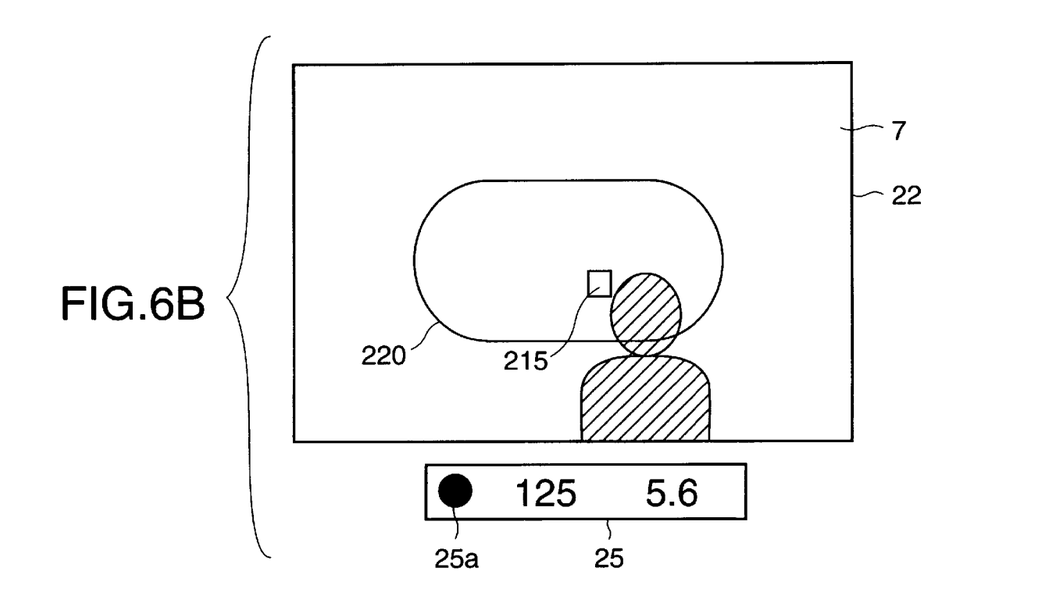

However, line of sight detection always suffers a detection error. Especially, when the user wears spectacles, the error is large, and the focal detection point of a portion where the principal object is present is not always selected. For example, as shown in FIG. 6B, the focus detection point 219 (see FIG. 6A) where the principal object is present should be selected, but the focus detection point 215 where no principal object is present is selected due to a line of sight detection error.

As shown in FIG. 6A, there is a gap between the neighboring focus detection points, and it is technically very hard to increase the number of focus detection points to fill such gap. For this reason, the principal object may fall between neighboring focus detection points. Even in such case, if the focus detection points are indicated all the time, the photographer can turn on the switch SW1 while adjusting the indication to the principal object, thus preventing the principal object from falling between neighboring focus detection points. However, as described above, since the focus detection points are not indicated all the time, the gazing point may be present in a gap between neighboring focus detection points. At this time, a focus detection point closest to the gazing point is selected against the photographer's will. Especially, when the photo-taking magnification is small, such phenomenon readily occurs.

In either case (line of sight detection suffers an error, and the principal object falls between neighboring focus detection points), since the principal object is not present at the selected focus detection point, focus detection calculation is done on the basis of the background, and as a result, the photo-taking lens is driven to the background. However, even when the lens is driven to adjust the focus on the background, the principal object can often be confirmed within the viewfinder. Hence, when the photographer adjusts the position of the principal object in the viewfinder to the selected focus detection point, the focus can be adjusted on the principal object.

However, when the lens is driven to adjust the focus on the background, the focus cannot always be adjusted on the principal object. For example, in photo-taking at night, if the background is dark, an in-focus incapable state readily occurs. In such in-focus incapable state, the aforementioned search operation is done. However, in such photo-taking environment, the contrast can be hardly raised to enable focus detection during the search operation. In this search operation, the photo-taking lens is driven from the nearest distance side to infinity, and in particular, when the photo-taking lens is driven to the nearest distance side, the principal object is considerably out-of-focus. As a result, the photographer may lose sight of the principal object, and miss an important shutter chance.

SUMMARY OF THE INVENTION

One aspect of the invention is to provide an optical device which comprises line of sight detection means for detecting a line of sight of a user, focus area selection means for selecting at least one of a plurality of focus areas on the basis of a detection result of the line of sight detection means, focus detection means for detecting a focus state of the focus area selected by the focus area selection means, and lens moving means for moving a lens, having control means for controlling the focus detection means and the lens moving means to repeat operation for checking if focus detection has become possible without moving the lens for a predetermined period of time when a detection result of the focus detection means indicates that focus detection is impossible, and to repeat the operation for checking if focus detection has become possible while moving the lens when the detection result of the focus detection means indicates that focus detection is impossible even after an elapse of the predetermined period of time, thus preventing unwanted search operation.

DESCRIPTION OF THE PREFERRED EMBODIMENTS

The present invention will be described in detail hereinafter by way of its illustrated embodiment.

Figure 1:
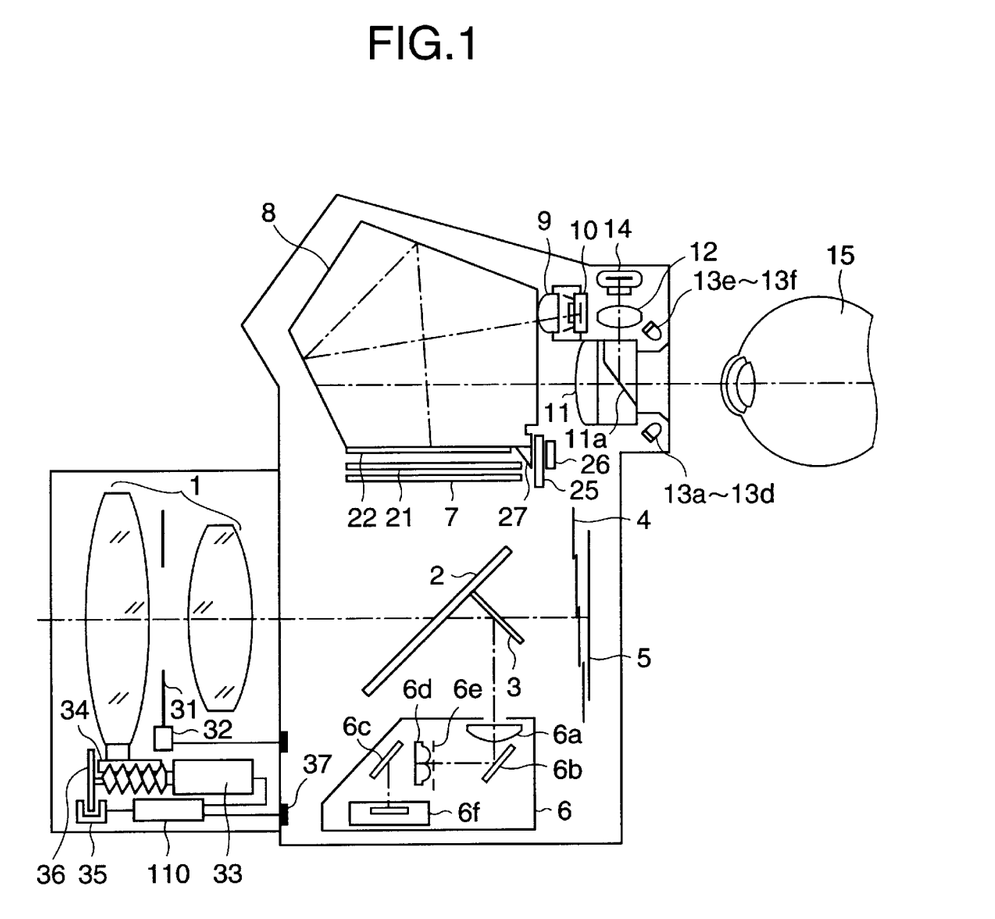
FIG. 1 is a view showing the layout of an optical system of a single-lens reflex camera according to an embodiment of the present invention.

FIG. 1 shows the layout of an optical system of a single-lens reflex camera according to an embodiment of the present invention. Referring to FIG. 1, a photo-taking lens 1 is composed of two lenses for the sake of simplicity, but is, in practice, composed of a larger number of lenses. A main mirror 2 is obliquely inserted into or retracted from a photo-taking optical path in correspondence with the viewfinder system observation state or photo-taking state. A sub mirror 3 reflects a light beam transmitted through the main mirror 2 toward the bottom of a camera body. A shutter 4 is placed in front of a photosensitive member 5, which comprises a silver halide film, a solid-state image sensing element such as a CCD or MOS element, or an image sensing tube such as Vidicon.

A focus detection device 6 is constructed by a field lens 6a placed in the neighborhood of an imaging plane, reflection mirrors 6b and 6c, a secondary imaging lens 6d, an aperture stop 6e, a focus detection sensor 6f comprising a plurality of CCDs, and the like. The focus detection device 6 of this embodiment uses a known phase difference scheme, and can detect the focus at each of a plurality of focus detection points 201 to 219 shown in FIG. 6A above.

A focusing screen 7 is placed on the prospective imaging plane of the photo-taking lens 1. A pentagonal prism 8 bends the viewfinder optical path. A transmission liquid crystal panel (to be referred to as an LCD hereinafter) 21 is inserted between the focusing screen 7 and pentagonal prism 8, and indicates a portion corresponding to a position where the focus detection point is selected. An imaging lens 9 and photometry sensor 10 are used for measuring object luminance in the photo-taking frame. The imaging lens 9 makes the focusing screen 7 and photometry sensor 10 be conjugate with each other via a reflection optical path in the pentagonal prism 8. An eyepiece 11 is placed behind the exit surface of the pentagonal prism 8, and has a light splitter 11a. The eyepiece 11 is used for observing the focusing screen 7 by an eyeball 15 of the photographer. The light splitter 11a comprises, e.g., a dichroic mirror that transmits visible light and reflects infrared light.

The main mirror 2, focusing screen 7, pentagonal prism 8, and eyepiece 11 construct a viewfinder optical system.

An imaging lens 12 is placed below an area sensor 14 with a two-dimensional matrix of photoelectric conversion elements such as CCDs. The area sensor 14 is placed to be conjugate with the vicinity of the pupil of the eyeball 15 of the photographer, which is located at a predetermined position in relation to the imaging lens 12. Six infrared emitting diodes (to be abbreviated as IREDs hereinafter) 13a to 13f serve as illumination light sources.

The eyepiece 11, imaging lens 12, IREDs 13a to 13f, and area sensor 14 are building elements of a line of sight detection means in this embodiment, together with a CPU 100 (to be described later).

A mask 22 forms a viewfinder field area. An in-finder LCD 25 displays photo-taking information on a portion outside the viewfinder field, and is illuminated by an illumination LED 26. Light transmitted through the in-finder LCD 25 is guided to the portion outside the viewfinder field, as indicated by 25 in FIG. 6A, and the photographer can be informed of various kinds of photo-taking information.

An aperture stop 31 is inserted in the photo-taking lens 1. An aperture driving device 32 includes an aperture driving circuit 111. A lens driving motor 33 is coupled to a lens driving member 34 including a driving gear and the like. A photocoupler 35 detects rotation of a pulse disk 36, which is interlocked with the lens driving member 34, and supplies the detected information to a lens focus point adjustment circuit 110. The focus point adjustment circuit 110 drives the lens driving motor by a predetermined amount on the basis of this information, and information of a lens driving amount supplied from the camera main body, thereby moving the photo-taking lens 1 to an in-focus position. A mount contact 37 serves as a known interface between the camera main body and lens.

Figure 2:
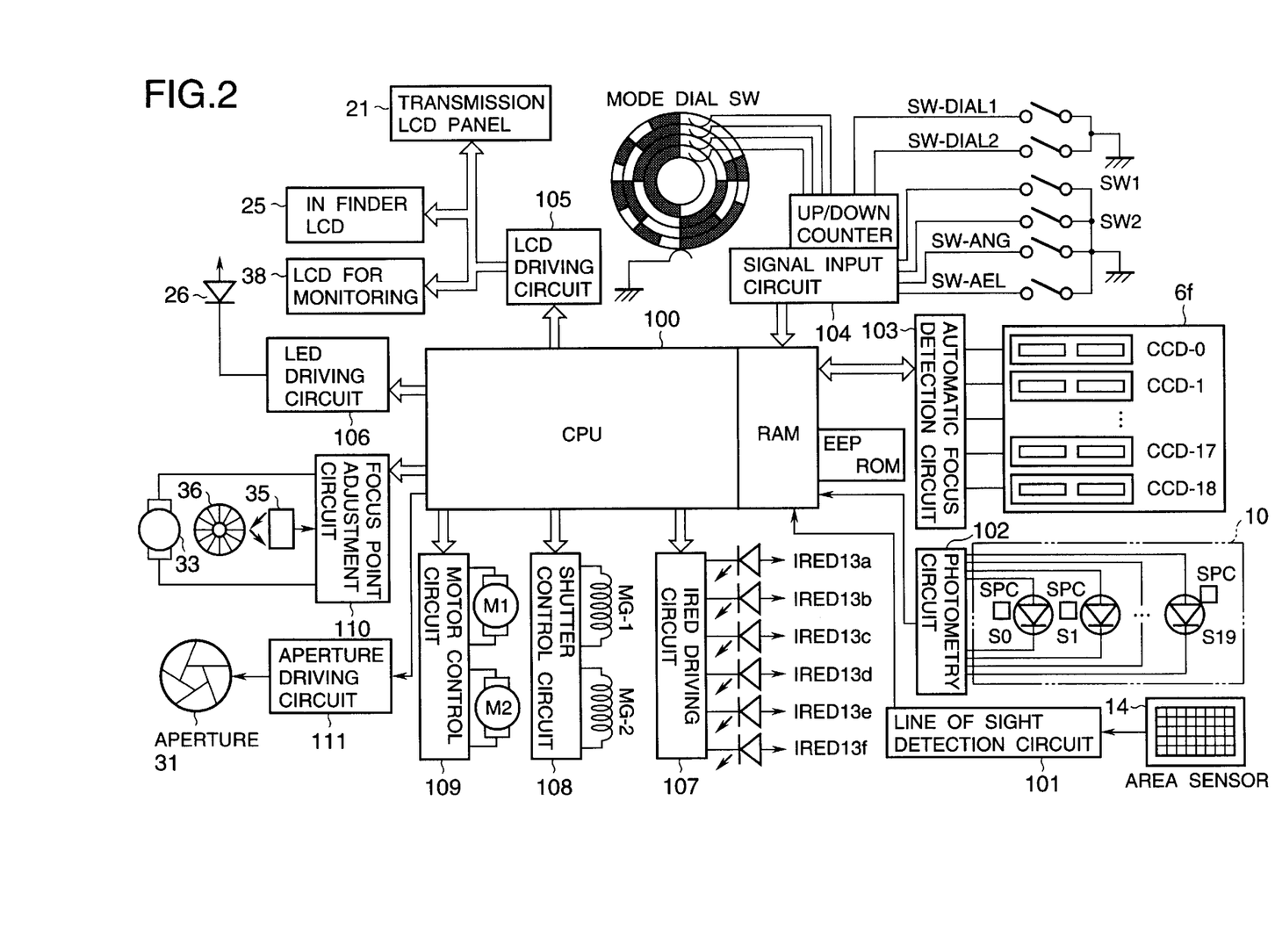
FIG. 2 is a block diagram showing the electrical arrangement of the single-lens reflex camera shown in FIG. 1.

FIG. 2 is a block diagram showing the electrical arrangement built in the single-lens reflex camera with the above arrangement. The same reference numerals in FIG. 2 denote the same parts as those in FIG. 1.

A central processing unit (to be abbreviated as a CPU hereinafter) 100 such as a microcomputer incorporated in the camera main body is connected to a line of sight detection circuit 101, photometry circuit 102, automatic focus detection circuit 103, signal input circuit 104, LCD driving circuit 105, LED driving circuit 106, IRED driving circuit 107, shutter control circuit 108, and motor control circuit 109. The CPU 100 exchanges signals with the focus point adjustment circuit 110 and aperture driving circuit 111 placed in the photo-taking lens 1 via the mount contact 37 shown in FIG. 1.

The CPU 100 incorporates a ROM for controlling camera operation, a RAM for storing variables, and an EEPROM (electrically erasable/writable memory) for storing various parameters.

The line of sight detection circuit 101 A/D converts an eyeball image output from the area sensor 14, and transmits that image information to the CPU 100. The CPU 100, in accordance with a predetermined algorithm, extracts feature points of the eyeball image, which are required for known line of sight detection, and calculates the line of sight of the photographer on the basis of the positions of the feature points. The photometry circuit 102 amplifies a luminance signal corresponding to the brightness of the object field, sent from the photometry sensor 10, and then logarithmically compresses and A/D-converts that signal. After that, the circuit 102 transmits the converted signal as object field luminance information to the CPU 100.

The focus detection sensor 6f is a known CCD line sensor constructed by 19 line sensors CCD-0, CCD-1, ..., CCD-18 corresponding to the positions of the 19 focus detection points 201 to 219 in the viewfinder frame. The automatic focus detection circuit 103 A/D-converts voltages obtained from these sensors of the focus detection sensor 6f, and sends the digital data to the CPU.

A photometry switch SW1 is turned on at the first stroke position of a release button (not shown) and starts photometry, AF (auto focus), and line of sight detection. A release switch SW2 is turned on at the second stroke position of the release button. Dial switches SW-DIAL1 and SW-DIAL2 are provided in an electronic dial (not shown), and the outputs from these switches are input to an up-down counter of the signal input circuit 104 to count the rotary click amount of the electronic dial. Signals from these switches are input to the signal input circuit 104, and are then transmitted to the CPU 100 via a data bus.

The LCD driving circuit 105 is a known circuit for driving the following LCDs to display, and can simultaneously control an LCD 38 for an external monitor (not shown), the in-finder LCD 25, and the transmission liquid crystal panel (LCD) 21 to display the aperture value, shutter speed, selected photo-taking mode, and the like. The LED driving circuit 106 controls the illumination LED 26 to keep it ON or flicker it.

The shutter control circuit 108 controls a magnet MG-1 that drives the leading curtain upon energization, and a magnet MG-2 that drives the trailing curtain to expose the photosensitive member with a predetermined amount of light. The motor control circuit 109 controls a motor M1 for winding and rewinding film, and a motor M2 for charging the main mirror 2 and shutter 4. The shutter control circuit 108 and motor control circuit 109 execute a series of camera release sequences.

Note that the details of the photometry circuit 102, shutter control circuit 108, motor control circuit 109, and aperture driving circuit 111 are not directly related to the present invention, and no more explanations will be given.

The view of the finder field and the like shown in FIG. 6A above will be explained in detail below since the single-lens reflex camera of this embodiment has the same arrangement.

FIG. 6A shows the view of the finder field in a state wherein all displayed contents to be indicated within the viewfinder frame limited by the viewfinder field mask 22 are ON (lighted). The focus detection points 201 to 219 correspond to the 19 line sensors CCD-0 to CCD-18 that detect the focus, and are laid out to be able to be ON within the viewfinder field upon detecting in-focus of the photo-taking lens or selecting the focus detection point (more specifically, frame indication patterns indicating these focus detection points are formed), thus indicating the focus detection point selected by, e.g., the line of sight of them.

The in-finder LCD 25 is placed outside the viewfinder field (below the viewfinder), as shown in FIG. 6A. The LCD 25 indicates focus detection failure or in-focus by flickering an indicator 25a or keeping it ON, and also indicates the shutter speed (Tv) value, aperture (Av) value, and the like by using 7-segment indicators.

The operation of principal part of the single-lens reflex camera with the above arrangement will be described below with reference to the flow chart shown in FIG. 3.

When the photographer has pressed the release button (not shown) to its first stroke position and it is detected in step #10 that the switch SW1 is turned on, the flow advances to step #11, and the CPU 100 drives the photometry circuit to execute photometry. In step #12, the CPU 100 drives the line of sight detection circuit 101, IRED driving circuit 107, and the like to perform line of sight detection, and detects the line of sight position (gazing point) of the user within the viewfinder. Since this line of sight detection is disclosed in detail in Japanese Patent Application Laid-Open Nos. 6-88936 and 6-125874, and that in this embodiment is the same as those described in these articles, a detailed description thereof will be omitted. But in brief, the line of sight detection is done as follows.

The CPU 100 turns on an appropriate one of the IREDs 13a to 13f via the IRED driving circuit 107 to illuminate the eyeball 15 of the photographer with light. In this state, the area sensor 14 for line of sight detection accumulates charges for a predetermined period of time via the line of sight detection circuit 101. After accumulation, the CPU 100 turns off the selected IRED, sequentially A/D-converts an eyeball image signal received from the area sensor 14, and stores the digital data in its RAM. The CPU 100 processes the eyeball image signal stored in the RAM by a known method to detect the eyeball rotation angle of the photographer. The CPU 100 corrects any personal difference using the detected eyeball rotation angle and personal difference correction data stored in the storage means (EEPROM), thus calculating the line of sight of the photographer, i.e., the line of sight coordinate position on the viewfinder. Finally, the CPU 100 selects the focus detection point closest to the calculated line of sight coordinate position.

If the line of sight information is obtained in this way, or if line of sight detection fails, the flow advances to step #13, and the CPU 100 drives the automatic focus detection circuit 103 to select one of the plurality of focus detection points 201 to 219 and controls the LCD 21 so that a portion corresponding to the selected focus detection point is visible. Then, the CPU 100 executes a subroutine "servo AF control" for controlling servo AF. The subroutine "servo AF control" will be explained in detail later. In this subroutine, the photo-taking lens is driven. In step #14, the CPU 100 checks if the switch SW1 is kept ON. If the switch SW1 is kept ON, the flow returns to step #13 to execute the subroutine "servo AF control". While the switch SW1 is kept ON, the same operation repeats itself, and when the switch SW1 is turned off, the flow returns to a main routine (not shown).

The subroutine "servo AF control" executed in step #13 will be explained below with reference to the flow chart shown in FIG. 4.

Figure 3:
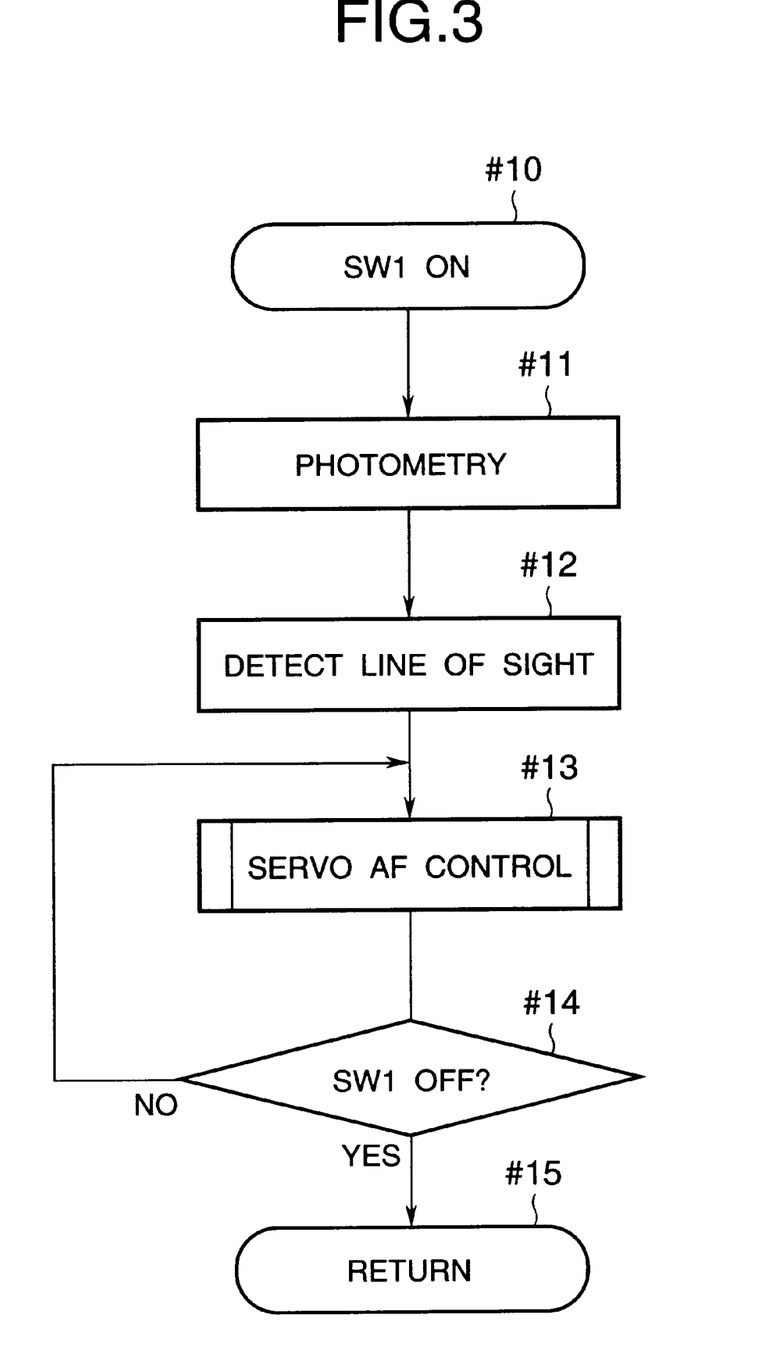
FIG. 3 is a flow chart showing the operation of principal part of the single-lens reflex camera shown in FIG. 1.

When this subroutine is called in step #13 in FIG. 3, the flow advances to step #21 via step #20, and the CPU 100 drives the automatic focus detection circuit 103 to start focus detection. Note that the focus detection is the same as that disclosed in Japanese Patent Application Laid-Open Nos. 3-211538, 63-216905, and the like, and a detailed description thereof will be omitted. Briefly stated, the following operation is done in this step.

One of the line sensors of the focus detection sensor 6f, which corresponds to the focus detection point selected by the line of sight detection means comprising the line of sight detection circuit 101, and the like, is selected. Then, photoelectric conversion and charge accumulation of two optical images formed on the selected line sensor by the secondary imaging lens 6e are started. When an appropriate charge accumulation level has been reached, the accumulation is ended, and the CPU 100 stores the obtained image signals as a pair of A/D-converted image signals in its RAM via the automatic focus detection circuit 103.

In step #22, the CPU 100 makes a correlation calculation of the pair of image signals stored in the RAM by a known method to obtain displacement between the two images. In this case, the CPU 100 also calculates the contrast of the two images. The CPU 100 then checks in step #23 if the contrast of the two images obtained in step #22 is lower than a predetermined value. If the contrast is lower than the predetermined value, the CPU 100 determines that it is incapable of focus detection, and the flow advances to step #27; otherwise, the CPU 100 determines that it is capable of focus detection, and the flow advances to step #24.

In this fashion, if the contrast is higher than the predetermined value, the flow advances to step #24, and the lens driving amount is calculated by a known method on the basis of the displacement obtained in step #22. In step #25, the CPU 100 drives the photo-taking lens 1 by the amount calculated in step #24 via the focus point adjustment circuit 110 and the like. After that, the flow returns to step #14 in FIG. 3.

If the contrast of the two images is lower than the predetermined value, the flow advances to step #27, as described above, and the CPU 100 starts its internal 300 msec timer. The flow then advances to step #28, and the CPU 100 drives the automatic focus detection circuit 103 to start focus detection as in step #21, thereby storing two image signals in its RAM. In step #29, the CPU 100 makes a correlation calculation by a known method on the basis of the pair of image signals stored in the RAM to obtain displacement between the two images, and also calculates the contrast of the two images.

The CPU 100 checks based on the contrast of the two images in step #30 if it is incapable of focus detection. If focus detection is possible, the flow immediately advances to step #24 to drive the lens. However, if focus detection is impossible, the flow advances to step #31 to check the status of the 300 msec timer. As a result, if the 300 msec timer has not reached a time-up, the flow returns to step #28 to repeat the above operation.

On the other hand, if the CPU 100 determines in step #31 that the 300 msec timer has reached a time-up, the flow advances to step #32 to execute a subroutine "search operation" (to be described later). Upon completion of this subroutine, the flow advances to step #24 to drive the lens, as described above.

As described above, since the search operation is not started before the 300 msec timer reaches a time-up, if the focus detection point where no principal object is present is selected owing to a line of sight detection error, and if it is determined there that focus detection is impossible, the photographer can adjust the erroneously selected focus detection point on the principal object and can accurately focus on a desired principal object within 300 msec since that point is made visible. Conventionally, if it is determined that focus detection is impossible, the search operation is immediately executed to start to drive the photo-taking lens from the nearest distance side to infinity, and the principal object considerably suffers out-of-focus. As a result, the photographer loses sight of the principal object and misses an important shutter chance. However, according to this invention, such problem can be avoided.

Figure 5:
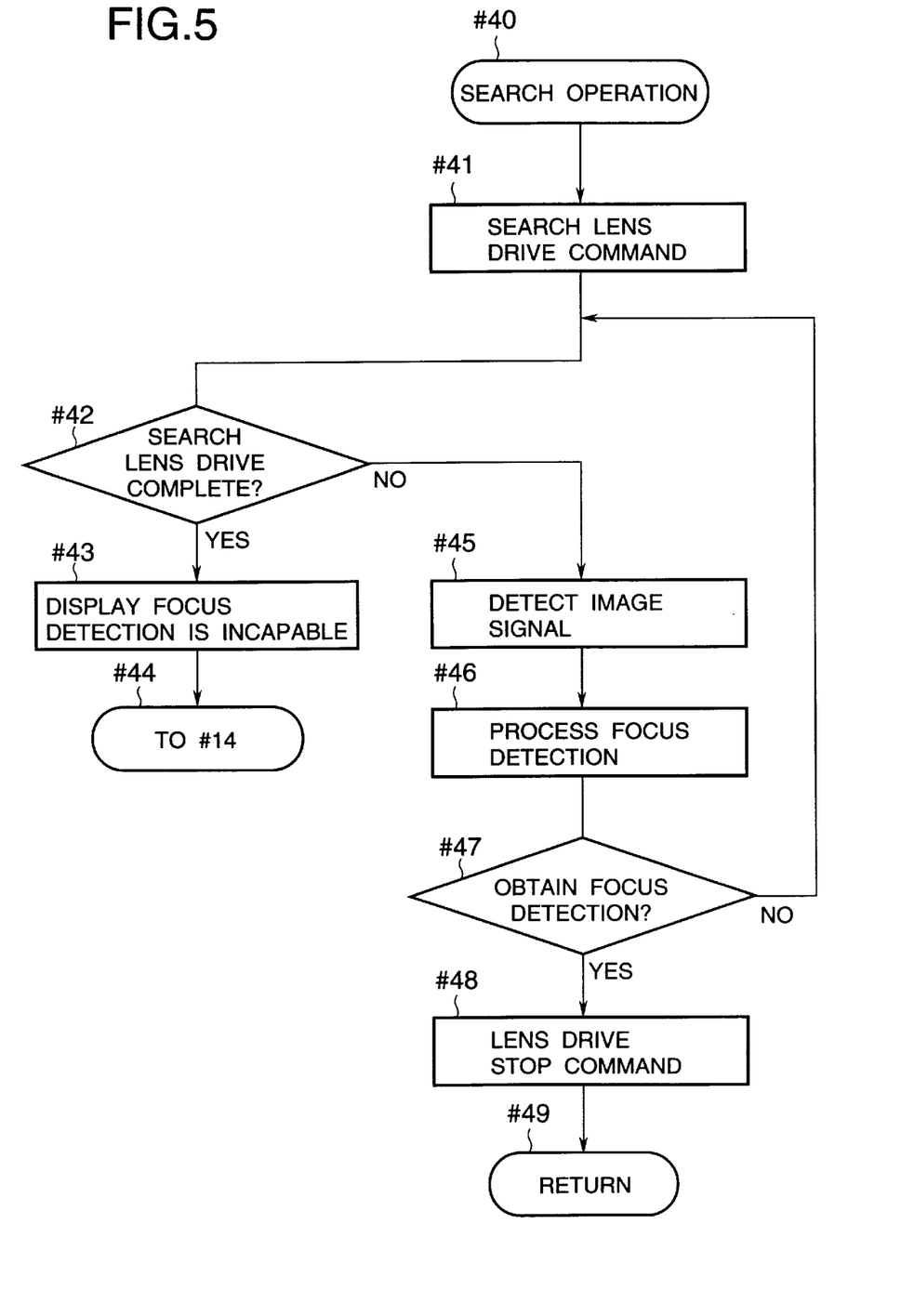
FIG. 5 is a flow chart showing the operation in a subroutine "search operation" executed in step #32 in FIG. 4.

FIG. 5 is a flow chart showing the subroutine "search operation" executed in step #32, and this subroutine will be explained below with reference to FIG. 5.

Figure 4:
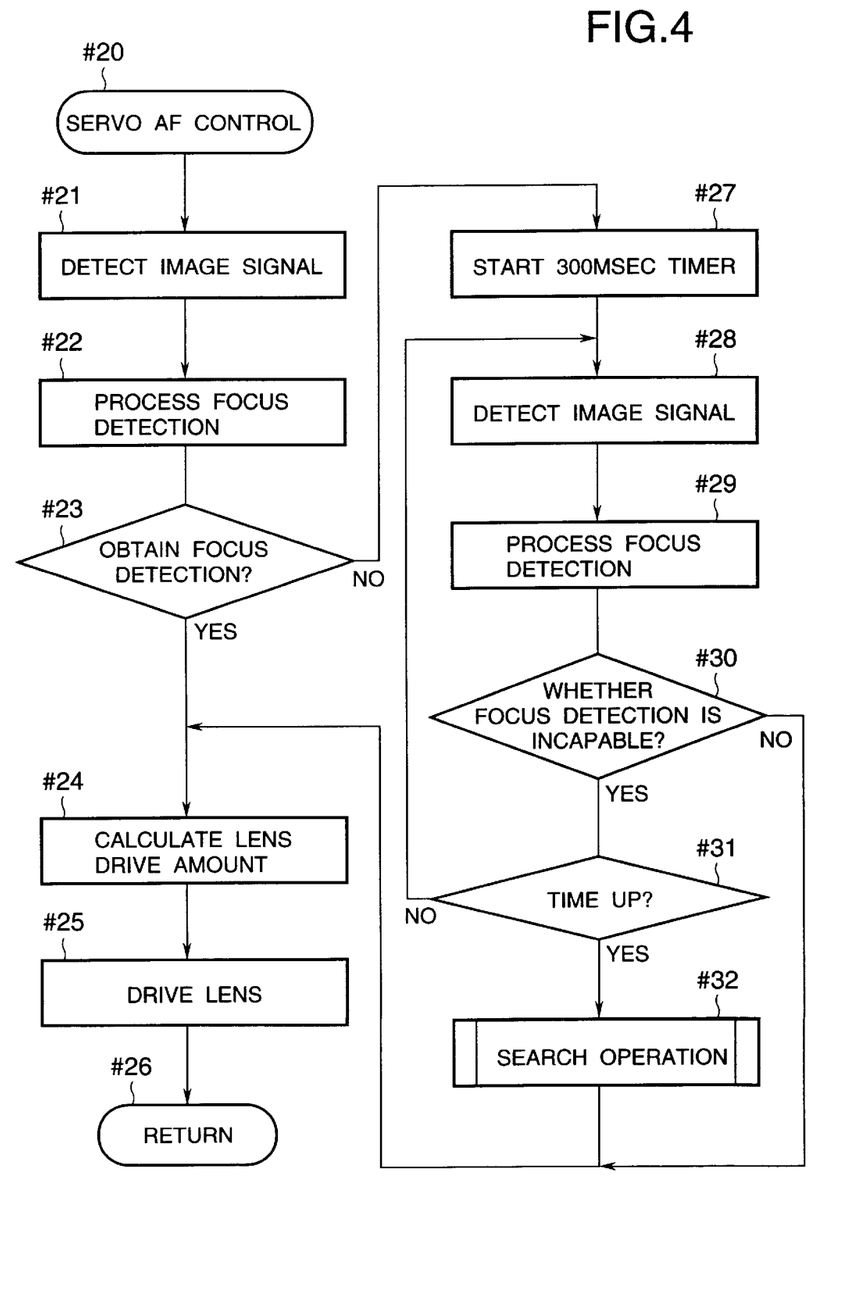
FIG. 4 is a flow chart showing the operation in a subroutine "servo AF control" executed in step #13 in FIG. 3.

When this subroutine is called in step #32 in FIG. 4, the flow advances to step #41 via step #40 to output a search lens drive command. The CPU 100 then checks in step #42 if the search lens drive is complete. If the search lens drive is not completed yet, the CPU 100 executes steps #45→#46→#47, i.e., the same operations as in steps #21→#22→#23 or steps #28→#29→#30 in FIG. 4, and checks in step #47 if it is capable of focus detection. If focus detection is possible, the flow advances to step #48 to stop the search lens drive, and the flow returns to step #24 in FIG. 4. On the other hand, if focus detection is impossible, the flow returns from step #47 to #42 to check again if the search lens drive is complete. If the search operation is not completed yet, the CPU 100 repeats the operations in step #45 and the subsequent steps.

If it is determined in step #42 that the search lens drive is complete, i.e., since focus detection stays impossible even after the search lens drive (YES is not determined in step #47), the flow advances to step #43 to flicker the indicator 25a in the in-finder LCD 25 so as to inform the photographer of that error. The flow then returns to step #14 in FIG. 3.

According to the embodiment described above, when the focus detection point where no principal object is present is selected due to a line of sight detection error (or the position of the principal object falling between neighboring focus detection points), and it is determined that focus detection at the selected focus detection point is impossible (in this embodiment, step #12 in FIG. 3→step #20→step #21→step #22→NO in step #23 in FIG. 4), since a so-called search operation is not started within a predetermined period of time (i.e., until YES is determined in step #31 in FIG. 4, that is, the 300 msec timer reaches a time-up), the photographer can adjust the selected focus detection point to the principal object within this predetermined period of time, and this can prevent sight of the principal object from being lost due to immediately started search operation (especially when the photo-taking lens is driven toward the nearest distance side) and an important shutter chance from being missed.
(Modification)

In the above embodiment, the present invention is applied to a single-lens reflex camera. However, the present invention is not limited to such specific camera, and can also be applied to other cameras and optical devices which have a plurality of focus detection points and have a function of so-called search operation.

What is claimed is:

1. An optical device comprising:
   a) focus detection means for detecting a focus state of an object;
   b) lens moving means for moving a lens; and
   c) control means for controlling said focus detection means and said lens moving means to repeat operation for checking if focus detection has become possible without moving said lens for a predetermined period of time when a detection result of said focus detection means indicates that focus detection is impossible, and to repeat the operation for checking if focus detection has become possible while moving said lens when the detection result of said focus detection means indicates that focus detection is impossible even after an elapse of the predetermined period of time.

2. A device according to claim 1, wherein when the detection result of said focus detection means indicates that focus detection is possible, said control means controls said lens moving means to adjust a focus on said object on the basis of a detection result of said focus detection means.

3. A device according to claim 1, wherein when focus detection has become possible within the predetermined period of time, said control means controls said focus detection means and said lens moving means to stop operation for detecting if focus detection has become possible while moving said lens even after the elapse of the predetermined period of time.

4. An optical device comprising:
   a) focus detection means for detecting a focus state of an object;
   b) lens moving means for moving a lens;
   c) determination means for determining whether or not said focus detection means is capable of focus detection;
   d) timer means for starting time measurement when it is determined that said focus detection means is incapable of focus detection; and
   e) control means for controlling said focus detection means and said lens moving means to repeat operation for detecting if focus detection has become possible without moving said lens until said timer means measures a predetermined period of time, and to repeat the operation for detecting if focus detection has become possible while moving said lens when a focus detection result of said focus detection means that focus detection is impossible even after said timer means has measured the predetermined period of time.

5. A device according to claim 4, wherein when the detection result of said focus detection means indicates that focus detection is possible, said control means controls said lens moving means to adjust a focus on said object on the basis of a detection result of said focus detection means.

6. A device according to claim 4, wherein when focus detection has become possible within the predetermined period of time, said control means controls said focus detection means and said lens moving means to stop operation for detecting if focus detection has become possible while moving said lens even after an elapse of the predetermined period of time.

7. An optical device comprising:
   a) line of sight detection means for detecting a line of sight of a user;
   b) focus area selection means for selecting at least one of a plurality of focus areas on the basis of a detection result of said line of sight detection means;
   c) focus detection means for detecting a focus state of the focus area selected by said focus area selection means;
   d) lens moving means for moving a lens; and
   e) control means for controlling said focus detection means and said lens moving means to repeat operation for checking if focus detection has become possible without moving said lens for a predetermined period of time when a detection result of said focus detection means indicates that focus detection is impossible, and to repeat the operation for checking if focus detection has become possible while moving said lens when the detection result of said focus detection means indicates that focus detection is impossible even after an elapse of the predetermined period of time.

8. A device according to claim 7, wherein when the detection result of said focus detection means indicates that focus detection is possible, said control means controls said lens moving means to adjust a focus on said object on the basis of a detection result of said focus detection means.

9. A device according to claim 7, wherein when focus detection has become possible within the predetermined period of time, said control means controls said focus detection means and said lens moving means to stop operation for detecting if focus detection has become possible while moving said lens even after the elapse of the predetermined period of time.

10. A device according to claim 7, further comprising display means for displaying the focus area selected by said focus area selection means, and wherein said display means displays the selected focus area at least within the predetermined period of time.

11. An optical device comprising:
   a) line of sight detection means for detecting a line of sight of a user;
   b) focus area selection means for selecting at least one of a plurality of focus areas on the basis of a detection result of said line of sight detection means;
   c) focus detection means for detecting a focus state of the focus area selected by said focus area selection means;

d) lens moving means for moving a lens;
e) determination means for determining whether or not said focus detection means is capable of focus detection;
f) timer means for starting time measurement when it is determined that said focus detection means is incapable of focus detection; and
g) control means for controlling said focus detection means and said lens moving means to repeat operation for detecting if focus detection has become possible without moving said lens until said timer means measures a predetermined period of time, and to repeat the operation for detecting if focus detection has become possible while moving said lens when a focus detection result of said focus detection means indicates that focus detection is impossible even after said timer means has measured the predetermined period of time.

12. A device according to claim 11, wherein when the detection result of said focus detection means indicates that focus detection is possible, said control means controls said lens moving means to adjust a focus on said object on the basis of a detection result of said focus detection means.

13. A device according to claim 11, further comprising display means for displaying the focus area selected by said focus area selection means, and wherein said display means displays the selected focus area at least within the predetermined period of time.

14. A device according to claim 11, wherein when focus detection has become possible within the predetermined period of time, said control means controls said focus detection means and said lens moving means to stop operation for detecting if focus detection has become possible while moving said lens even after the elapse of the predetermined period of time.

* * * * *